No. 888,967. PATENTED MAY 26, 1908.
F. P. DEWEY.
CIRCULATION APPARATUS.
APPLICATION FILED MAR. 7, 1904.

WITNESSES:

INVENTOR
F. P. Dewey.
By
Wilkinson & Fisher,
Attorneys.

UNITED STATES PATENT OFFICE.

FREDERIC P. DEWEY, OF WASHINGTON, DISTRICT OF COLUMBIA.

CIRCULATION APPARATUS.

No. 888,967.  Specification of Letters Patent.  Patented May 26, 1908.

Application filed March 7, 1904. Serial No. 197,031.

*To all whom it may concern:*

Be it known that I, FREDERIC P. DEWEY, a citizen of the United States, residing at Washington, in the District of Columbia, have invented certain new and useful Improvements in Circulation Apparatus; and I do hereby declare the following to be a full, clear, and exact description of the invention, such as will enable others skilled in the art to which it appertains to make and use the same.

My invention relates to an improvement in circulation apparatus, whereby a current of gas causes a steady circulation of liquid.

My invention relates primarily to apparatus for the treatment of copper ores, but it is also applicable to apparatus for producing chemical changes in general by the action of gases on liquids, and especially liquids holding finely divided material in suspension to be acted upon by the liquid.

My invention consists of an improved arrangement of parts for causing the circulation of the liquid by the particular manner of introducing the reactive gas into the liquid in addition to bringing the gas and liquid into intimate contact under conditions most favorable for accomplishing the desired chemical changes.

Figure 1:
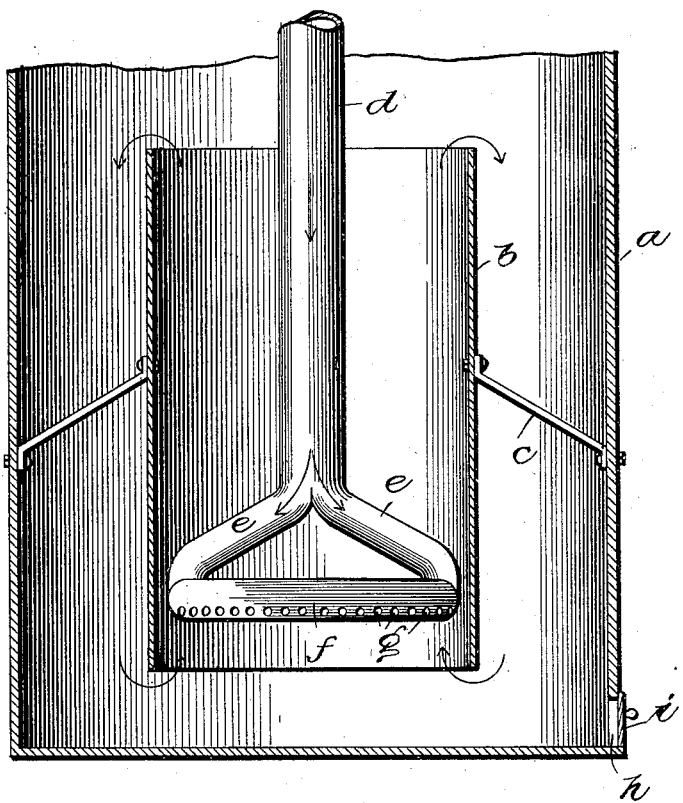
Figure 2:
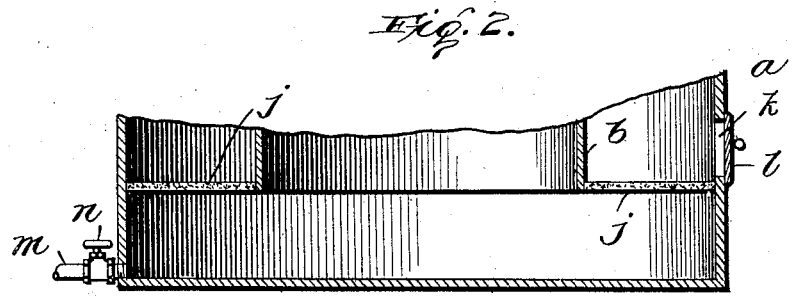

In the accompanying drawings:— Figure 1 represents a vertical section of my improved apparatus, and Fig. 2 is a similar section of a part of a modification.

My apparatus consists of a containing vessel or tank $a$, which may be constructed of any suitable material according to the character of the liquid operated upon and the chemical reactions which take place, such as wood, stone, metal, cement, earthen-ware, etc. This tank may be open or provided with a cover as desired. Within the tank is a tube $b$ open at both ends and suitably supported so as to be separated by an annular space from the tank $a$. This tube may be supported by inclined braces $c$, as shown in Fig. 1, or by braces from the bottom of the tank, or it may be hung by straps from the cover. It may be made of the same material as the tank $a$, but is not necessarily so made.

Within the tube or cylinder $b$ is a gas inlet pipe $d$, which communicates by two or more branches $e$ with a horizontal ring $f$ provided with numerous perforations $g$, located near the bottom. I do not restrict myself, however, to the form shown in Fig. 1, as the lower end of this pipe $d$ may be a simple closed pipe with small holes drilled in the end and even part way up the sides. It may also end in a suitable perforated coil, or it may be branched and the branches perforated.

In Fig. 1, I have shown this pipe $d$ as coming in through the top of the tank, but obviously, it may come in through the bottom or through the sides, the essential point being that this tube shall deliver bubbles of gas into the tube $b$ when the apparatus is in operation.

One very essential feature of my invention is that the delivery end of the gas tube $d$ shall be supplied with a number of fine perforations, for the purpose of delivering the gas to the solution in many fine bubbles, thereby effecting a thorough agitation of the same and permitting the gas and liquid to interact between each other.

A suitable discharge opening $h$ is provided near the lower part of the tank, which may be closed by a door $i$. The ore or other material to be treated is fed in at the top of the tank, preferably outside of the tube $b$. When the tank $a$ is covered, the cover may be provided with suitable openings for introducing the charge and for the escape of the waste gases. If desired, said gases may be caused to escape through a weighted valve in order to maintain a certain pressure during the operation of the gases. The reactive gases are caused to pass through the tube $d$ by any suitable blowing apparatus, such as an air pump or fan, and in case the material operated upon is of such a character that the re-actions are facilitated by heat, the gases may be forced in by a steam blower, such as the well known Körting steam blower. In some cases, if the tank $a$ is provided with a tight cover, the gases may be caused to pass through the tube $d$ by a suction apparatus applied near the top of the tank $a$.

The operation of my device as shown in Fig. 1 is as follows:—The liquid to be operated upon, or the liquid containing finely divided material in suspension, is introduced into the tank $a$ to the proper depth, preferably just below the top of the tube $b$. The tube $b$ being open at the bottom is simultaneously filled. Then the re-active gases or mixture of gases designed to act chemically on the liquid, or upon the solid suspended in the liquid, is forced in through the tube $d$ and bubbles up through the tube $b$, carrying the liquid and solid matter suspended therein with it, thereby causing an upward flow through the tube $b$, and consequently, a downward flow around said tube, thus thoroughly mixing the gases, liquid, and solid, and facilitating the chemical re-actions, on account of the vigorous stirring of the whole mass, and because each bubble presents to the liquid a large surface of gas which is thus rapidly absorbed, thus hastening the chemical re-actions desired. The circulation is caused by the fact that the numerous bubbles of gas in the tube $b$ render the liquid therein of a less specific gravity than the liquid outside of the tube $b$, whereupon the liquid in the tube $b$ rises and flows over the edge thereof, while the liquid outside of the tube $b$ falls and enters said tube at the bottom. As soon as the liquid reaches the top of the tube $b$, it of course loses its gas and becomes heavier, which also aids in the downward flow of the liquid around the tube $b$.

In the modification shown in Fig. 2, the lower part of the tube $b$ is connected with the tank $a$ by a filtering material $j$. In this case the tank $a$ is provided with an opening $k$ just above the filtering material $j$ for the discharge of the solid material, which opening is closed by a door $l$. $m$ represents a pipe for the discharge of the liquid, which is provided with a valve $n$. In this modification the solid does not circulate to any appreciable extent around the tube $b$ as the filter $j$ prevents this.

In some cases the primary chemical action upon the liquid itself or the salts held in solution may be all that is desired, but in many cases, secondary chemical re-actions may be obtained on the solid material held in suspension in a finely divided condition within the liquid, which solid circulates with the liquid, and this is the chief application of my apparatus. By it the cost of carrying on various chemical and metallurgical processes is greatly reduced, while some materials which at present cannot be treated to advantage by any known apparatus, and which are therefore valueless, can be treated in my apparatus at a good profit, such for instance, are the low grade oxidized silicious copper ores which occur in enormous quantities at different places in this country, but which are not now mined because the copper which they contain cannot be economically recovered by any known method. In some cases, however, it may be desirable to produce chemical changes in the liquid within the tube $b$, and to employ the chemical substances thus produced in acting on solid material packed around the tube $b$. In this case, the apparatus shown in Fig. 2 is used.

The treatment of the low grade oxidized silicious copper ores which my apparatus is especially designed for varies according to the character of the ore. If the ore carries the copper, finely disseminated, through a comparatively close gangue, it is crushed fine, so that it will pass through a sieve from sixty to one hundred mesh and introduced into the apparatus between the tubes $a$ and $b$ with enough water to make an easily flowing pulp. It makes absolutely no difference, however, whether the charge of material to be treated is placed within or without the tube $b$. It rises to the same point within and without said tube no matter how or where it is put into the apparatus. Then a mixture of sulfurous acid $SO_2$ and air is passed into the apparatus through the pipe $d$. Perhaps the simplest way of considering the chemical re-action is to consider that the sulfurous acid first attacks the copper, forming copper sulfite, and this is immediately oxidized by the air to copper sulfate, but other re-actions are quite possible, and the re-actions which really take place are undoubtedly much more complex. However, the final result of the joint action of the air and sulfurous acid is the formation of copper sulfate which goes in solution in the water.

The sulfurous acid required may be obtained in any suitable way, as by the combustion of sulfur in an ordinary sulfur burner, or by the roasting of pyrites, or similar sulfuret ores in any of the ordinary roasters. In some cases, the gases obtained from the roasting of auriferous sulfids in preparing them for further treatment may be utilized to advantage. When the copper in the ore has practically all gone into solution, the charge is withdrawn from the apparatus. The residue is then separated from the solution by any ordinary means, as by filtering and washing. The residue may then be treated for the recovery of any valuable metal it may still contain, or it may be thrown away.

The copper sulfate solution may be treated in various ways to utilize the copper it contains. Crystallized bluestone may be recovered from it in the ordinary way. It may be run over scrap iron to precipitate the copper as cement copper, which is then smelted and refined to ingot copper. The copper may be recovered by the electric current in the ordinary way, or the solution may be utilized in various other ways. The last washings of the ore residue, which are low in copper, are preferably returned to the dissolving apparatus to be used in the treatment of a fresh lot of ore. When, however, the ore is open and porous, or the copper is coarsely disseminated through the gangue, a high extraction can often be secured by employing a modified apparatus having a filter, as shown in Fig. 2. In this case, the coarsely crushed ore is fed into the space between the parts $a$ and $b$ upon the filter with the addition of the proper amount of water or washings from a previous charge. A mixture of sulfurous acid and air is then forced in through the tube $d$, forming sulfuric acid, which flows up through the tube $b$ and down outside of it upon the ore. Here the acid attacks the copper, forming sulfate of copper as before, and the solution travels on until it comes into the bottom of the tube $b$ again, where it is charged with more acid, this action continuing over and over. The circulation is continued until practically all the copper is dissolved out of the ore, when the solution is withdrawn and treated for the copper it contains and the residue washed and disposed of.

Low grade sulfuret ores of copper may be roasted and then treated in my apparatus, and the gases obtained by the roasting may be utilized as a source of the sulfurous acid in dissolving the copper out of the roasted ore. Furthermore, copper matte may be roasted and treated for the production of bluestone in my apparatus, and the gases developed in the preparation of the matte will supply the sulfurous acid required.

While my apparatus is especially designed for treating copper ores, it is evident that it may be used for various other purposes, such as the cyanid process of extracting precious metals, for the boiling of wood to convert it into paper pulp, and for the preparation of the solution of alkaline sulfite used in pulp boiling. Furthermore, water may be aerated or purified, oils bleached, and solutions freed from iron by blowing air through them, and the air may be ozonized previous to its use in my apparatus for any desired purpose.

In the drawing I have shown the gas delivery pipe within the inner tube. It is obvious, however, that it could be located in the space between the outer and the inner tube, in which case the direction of the circulation of liquid would be reversed; for example, a perforated circular pipe could be used in the annular space between the tank $a$ and the tube $b$.

Having thus described my invention, what I claim as new and desire to secure by Letters Patent of the United States is:—

1. In a circulation apparatus, the combination of a tank or containing vessel, a tube shorter than said tank sustained within said tank, and a gas supply pipe provided with perforations at or near its lower end, located in said tube, substantially as described.

2. In a circulation apparatus, the combination of a tank or containing vessel, a tube shorter than said tank sustained within said tank and dividing it vertically into two sections, and a gas supply pipe provided with perforations at or near its lower end, located in said tube, substantially as described.

3. In a circulation apparatus, the combination of a tank or containing vessel, a tube shorter than said tank sustained within said tank and dividing it vertically into two sections, and a gas supply pipe, provided with downwardly opening perforations delivering into one of the sections of the containing vessel, substantially as described.

4. In a circulation apparatus, the combination of a tank or containing vessel, a tube shorter than said tank sustained within said vessel, and a downwardly extending gas supply pipe provided with perforations at or near its lower end located in said tube, substantially as described.

5. In a circulation apparatus, the combination of a tank or containing vessel, a smaller shorter tube supported within said vessel, and a gas supply pipe within said tube extending nearly to the bottom thereof, and provided with perforations at or near its lower end, substantially as described.

6. In a circulation apparatus, the combination of a tank or containing vessel, a concentrically arranged shorter tube supported within said vessel, and a concentrically arranged gas supply pipe provided with downwardly opening perforations, substantially as described.

7. In a circulation apparatus, the combination of a tank or a containing vessel, a concentrically arranged smaller shorter tube supported within said vessel, and a downwardly extending concentrically arranged gas supply pipe within said tube extending nearly to the bottom thereof, and provided with perforations at or near its lower end, substantially as described.

8. In a circulation apparatus, the combination of a tank or containing vessel, a shorter smaller tube supported within said tank, braces connected to said tank and to said tube, a gas supply pipe within said tube, said gas supply pipe being branched near its lower end, said branches communicating with a perforated lower ring, substantially as described.

9. In a circulation apparatus, the combination of a tank or containing vessel, a shorter smaller tube supported within said tank, a filter connecting the lower part of said tube with said tank, and a gas supply pipe within said tube, said gas supply pipe being provided with perforations, substantially as described.

10. In a circulation apparatus, the combination of a tank or containing vessel, a shorter smaller tube supported within said tank, a filter connecting the lower part of said tube with said tank, and a gas supply pipe within said tube, said gas supply pipe being provided with perforations at or near its lower end, substantially as described.

11. In a circulation apparatus, the combination of a tank or containing vessel, a shorter smaller tube supported within said tank, a filter connecting the lower part of said tube with said tank, and a gas supply pipe provided with perforations delivering into said tube, substantially as described.

In testimony whereof, I affix my signature, in presence of two witnesses.

FREDERIC P. DEWEY.

Witnesses:
S. C. MILLER,
W. F. BOWEN.